(12) United States Patent
Igarashi

(10) Patent No.: US 9,707,649 B2
(45) Date of Patent: Jul. 18, 2017

(54) METHOD FOR CENTERING GRINDING WHEEL IN THREAD GRINDER AND MEASUREMENT DEVICE FOR CENTERING

(71) Applicant: NSK LTD., Tokyo (JP)

(72) Inventor: Kiyoshi Igarashi, Fujisawa (JP)

(73) Assignee: NSK LTD., Tokyo (JP)

( * ) Notice: Subject to any disclaimer, the term of this patent is extended or adjusted under 35 U.S.C. 154(b) by 149 days.

(21) Appl. No.: 14/439,500

(22) PCT Filed: Oct. 25, 2013

(86) PCT No.: PCT/JP2013/078993
§ 371 (c)(1),
(2) Date: Apr. 29, 2015

(87) PCT Pub. No.: WO2014/069371
PCT Pub. Date: May 8, 2014

(65) Prior Publication Data
US 2015/0298269 A1 Oct. 22, 2015

(30) Foreign Application Priority Data
Oct. 31, 2012 (JP) ................................. 2012-240925

(51) Int. Cl.
*B23P 19/10* (2006.01)
*G01B 5/14* (2006.01)
(Continued)

(52) U.S. Cl.
CPC ................ *B23P 19/10* (2013.01); *B23G 1/38* (2013.01); *B23G 1/48* (2013.01); *B24B 41/04* (2013.01);
(Continued)

(58) Field of Classification Search
CPC ........ B23P 19/10; B23P 19/102; B23P 19/105; B23P 19/12; B23G 1/38; B23G 1/48;
(Continued)

(56) References Cited

U.S. PATENT DOCUMENTS 4,236,355 A * 12/1980 Hennenfent ............. B24D 5/16
451/342
4,637,144 A 1/1987 Schemel
(Continued)

FOREIGN PATENT DOCUMENTS

CN 101175604 A 5/2008
CN 201783843 U 4/2011
(Continued)

OTHER PUBLICATIONS

Search Report dated Jan. 28, 2014, issued by the International Searching Authority in counterpart International Application No. PCT/JP2013/078993.
(Continued)

*Primary Examiner* — John C Hong
(74) *Attorney, Agent, or Firm* — Sughrue Mion, PLLC

(57) ABSTRACT

In a thread grinder which grinds a thread grove on an inner surface of a workpiece while a rotation axis of a grinding wheel shaft is inclined with respect to an axis of a main shaft, a centering master which has a cylindrical outer surface is mounted to the main shaft. A measuring unit including two measuring instruments such that probes can contact two edges of a grinding wheel is mounted to the centering master. The origins of the measuring instruments are set by the probes contacting the cylindrical outer surface of the centering master. The measuring unit is moved in the axial direction of the centering master to bring the probes of the two measuring instruments into contact with the edges of the grinding wheel, respectively. The position of the grind-
(Continued)

ing wheel shaft is adjusted such that measured values obtained by measuring instruments become same.

4 Claims, 6 Drawing Sheets

(51) Int. Cl.
    *B24B 41/04*     (2006.01)
    *B24B 49/10*     (2006.01)
    *B23G 1/38*     (2006.01)
    *B23G 1/48*     (2006.01)
    *G01B 5/252*     (2006.01)

(52) U.S. Cl.
    CPC ............... *B24B 49/10* (2013.01); *G01B 5/14* (2013.01); *G01B 5/252* (2013.01); *G01B 2210/44* (2013.01)

(58) Field of Classification Search
    CPC ......... B24B 49/10; B24B 51/00; B24B 41/04; G01B 5/14; G01B 5/252; G01B 2210/44; Y10T 29/49764; Y10T 29/49771; Y10T 29/49778; Y10T 29/4978; Y10T 29/53913
    See application file for complete search history.

(56) References Cited

U.S. PATENT DOCUMENTS

| | | | | |
|---|---|---|---|---|
| 4,907,375 A * | 3/1990 | Weinich | ............... | B24D 5/16 451/342 |
| 6,206,766 B1 * | 3/2001 | Schuller | ............... | B24D 5/00 451/259 |
| 6,519,861 B1 * | 2/2003 | Brueck | ............... | B23Q 3/183 33/200 |
| 6,827,631 B2 * | 12/2004 | Tomotaki | ............... | B24B 1/00 409/165 |
| 8,215,214 B2 * | 7/2012 | Sakai | ............... | B23B 3/168 82/164 |
| 2003/0232584 A1 * | 12/2003 | Tomotaki | ............... | B24B 1/00 451/242 |
| 2013/0072096 A1 * | 3/2013 | Hoerner | ............... | B23F 23/1218 451/259 |
| 2015/0298269 A1 * | 10/2015 | Igarashi | ............... | B24B 41/04 29/407.1 |

FOREIGN PATENT DOCUMENTS

| | | | |
|---|---|---|---|
| JP | 47-009093 A | | 10/1972 |
| JP | 61-019567 A | | 1/1986 |
| JP | H 569316 A | | 3/1993 |
| JP | 11267969 A | * | 10/1999 |
| JP | H 11267969 A | | 10/1999 |
| JP | 2000061782 A | * | 2/2000 |
| JP | 2002-326144 A | | 11/2002 |
| JP | 4672901 B2 | | 4/2011 |

OTHER PUBLICATIONS

Written Opinion dated Jan. 28, 2014, issued by the International Searching Authority in counterpart International Application No. PCT/JP2013/078993.

Office Action dated Jun. 3, 2015, issued by the State Intellectual Property Office of P.R. China in counterpart Chinese Application No. 201380002534.1.

* cited by examiner

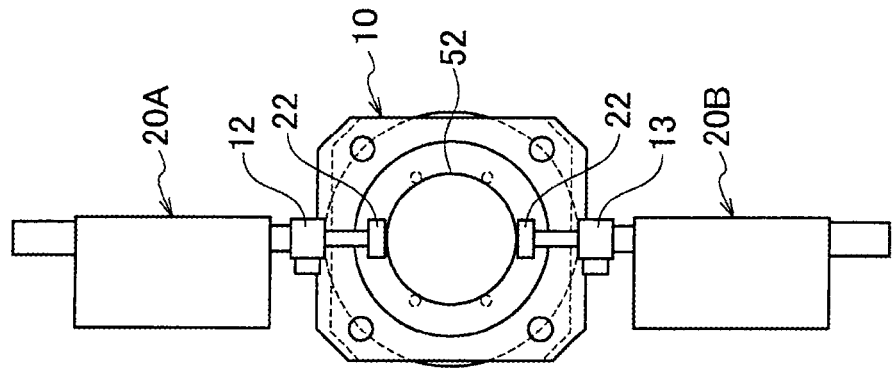
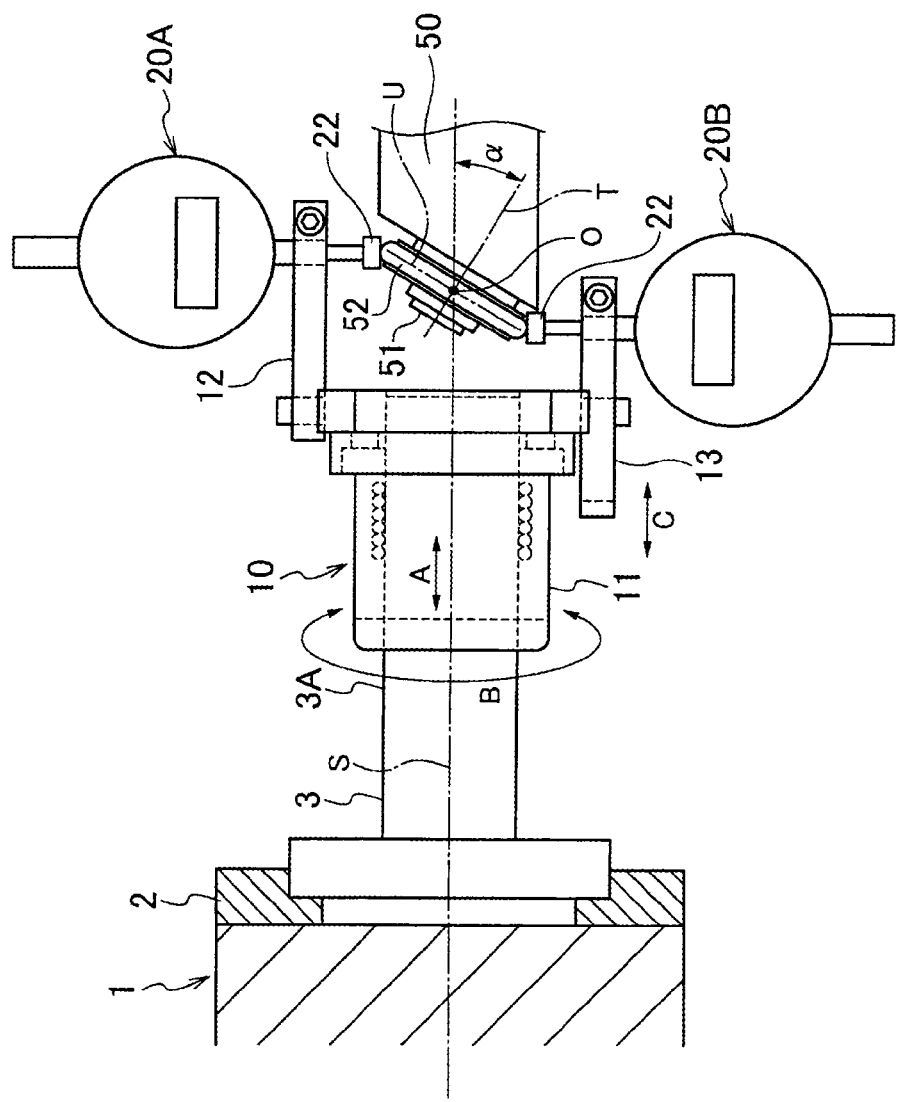

METHOD FOR CENTERING GRINDING WHEEL IN THREAD GRINDER AND MEASUREMENT DEVICE FOR CENTERING

TECHNICAL FIELD

The present invention relates to a method for centering a grinding wheel in a thread grinder and a measurement device for centering used in employing the method.

BACKGROUND ART

In a thread grinder configured to grind a thread groove on a cylindrical inner surface of a workpiece such as a thread groove of a ball nut, a grinding wheel is attached to a tip of a grinding wheel shaft, the workpiece is attached to a main shaft facing the grinding wheel shaft, and a rotation axis of the grinding wheel shaft is inclined with respect to an axis of the main shaft in accordance with a lead angle of the thread groove. In the thread grinder, the centering of the grinding wheel needs to be performed with respect to the workpiece before the grinding.

For example, Patent Document 1 discloses a conventional centering method in which a spherical measurement member is attached to a grinding wheel attaching position on the axis of the grinding wheel shaft inclined with respect to the rotation axis of the workpiece and a measuring instrument is held at the main shaft which rotates the workpiece. The measuring instrument is rotated around the measurement member to measure a position of the measurement member by the measuring instrument, the grinding wheel shaft is moved based on the measurement result to position a spherical center of the measurement member on the rotation axis of the workpiece, and then the grinding wheel is replaced with the measurement member and attached to the grinding wheel shaft.

PRIOR ART DOCUMENT

Patent Document

Patent Document 1: JP-A-2002-326144

SUMMARY OF THE INVENTION

Problem to be Solved

According to the centering method of Patent Document 1, the measuring is performed by using a dedicated measurement jig (the spherical measurement member) attached to the grinding wheel attaching part, and the grinding wheel itself is not measured. Therefore, it is necessary to perform a cumbersome operation of replacing the measurement jig and the grinding wheel, which may deteriorate the measuring precision during the replacing operation.

The present invention has been made in view of the above circumstances, and an object of the present invention is to provide a method for centering a grinding wheel in a thread grinder and a measurement device for centering which are capable of precisely performing the centering with a simple measuring operation.

Means for Solving the Problem

The object of the present invention can be achieved by the following configuration.

(1) A method for centering a grinding wheel in a thread grinder which includes: a grinding wheel shaft; a grinding wheel attached to the grinding wheel shaft; and a main shaft which faces the grinding wheel shaft and to which a workpiece having a cylindrical inner surface to be ground with a thread groove is attached, wherein a rotation axis of the grinding wheel shaft is inclined with respect to an axis of the main shaft in accordance with a lead angle of the thread groove, the method comprising:

mounting a centering master having a cylindrical outer surface to the main shaft such that a center axis of the centering master is matched with the axis of the main shaft;

mounting a measuring unit to the centering master to be movable in an axis direction of the centering master, the measuring unit including: a first measuring instrument having a first probe configured to contact one edge part of the grinding wheel in an orthogonal direction orthogonal to the axis direction of the centering master; and a second measuring instrument having a second probe configured to contact another edge part of the grinding wheel opposite to the one edge part in the orthogonal direction;

setting origins of the first and second measuring instruments by bringing the first and second probes into contact with the cylindrical outer surface of the centering master;

moving the measuring unit in the axis direction of the centering master to thereby bring the first and second probes into contact with the respective edge parts of the grinding wheel in the orthogonal direction; and centering a center of the grinding wheel with respect to the axis of the main shaft by adjusting a position of the grinding wheel shaft such that a measured value obtained based on the origin of the first measuring instrument and a measured value obtained based on the origin of the second measuring instrument become same.

(2) The method according to (1), further comprising:

adjusting positions of the first and second measuring instruments such that the first probe contacts one edge part of the grinding wheel in a direction orthogonal to an inclined direction of the grinding wheel and the second probe contacts another edge part of the grinding wheel opposite to the one edge part in the direction orthogonal to the inclined direction of the grinding wheel, at a state where the measuring unit is rotated by 90° about the centering master;

moving the first and second measuring instruments of which the origins are set using the centering master, in the axis direction of the centering master, to thereby bring the first and second probes into contact with the two edge parts of the grinding wheel in the direction orthogonal to the inclined direction of the grinding wheel; and centering the center of the grinding wheel with respect to the axis of the main shaft by adjusting the position of the grinding wheel shaft such that a measured value obtained based on the origin of the first measuring instrument and a measured value obtained based on the origin of the second measuring instrument become same.

(3) A measurement device for centering a grinding wheel in a thread grinder including: a grinding wheel shaft, a grinding wheel attached to the grinding wheel shaft; and a main shaft which faces the grinding wheel shaft and to which a workpiece having a cylindrical inner surface to be ground with a thread groove is attached, wherein a rotation axis of the grinding wheel shaft is inclined with respect to an axis of the main shaft in accordance with a lead angle of the thread groove, the measurement device comprising:

a centering master which has a cylindrical outer surface and is configured to be mounted to the main shaft such that a center axis of the centering master is matched with the axis of the main shaft; and a measuring unit which includes a cylindrical body configured to be mounted to the cylindrical outer surface of the centering master to be movable in an axis direction and a circumferential direction of the centering master, a first measuring instrument having a first probe configured to contact one edge part of the grinding wheel in an orthogonal direction orthogonal to the axis direction of the centering master, and a second measuring instrument having a second probe configured to contact another edge part of the grinding wheel opposite to the one edge part in the orthogonal direction, and which is configured to measure a displacement of the grinding wheel in the orthogonal direction by the first and second measuring instruments.

(4) The measurement device according to (3), wherein at least one of the first and second measuring instruments is configured to be moveable relative to the cylindrical body in the axis direction of the centering master.

Effects of the Invention

According to the method for centering the grinding wheel in the thread grinder of the present invention, at a state where the grinding wheel is mounted to the grinding wheel shaft, it is possible to precisely measure a position of the inclined grinding wheel by simultaneously bringing the probes of the two measuring instruments into contact with the two edge parts of the grinding wheel in the inclined direction, from a radial direction orthogonal to the axis of the main shaft. Therefore, it is not necessary to perform a cumbersome operation of replacing a dedicated measuring jig and a grinding wheel. Also, there is no concern that the measuring precision is deteriorated due to the replacing operation, and the centering can be precisely performed with a simple measuring operation.

Also, according to the measurement deice for centering the grinding wheel in the thread grinder of the present invention, it is possible to simply and precisely perform the centering of the inclined grinding wheel with the grinding wheel being mounted to the grinding wheel shaft, just by using the centering master and the measuring unit having the two measuring instruments attached to the cylindrical body.

BRIEF DESCRIPTION OF THE DRAWINGS

FIGS. 1A and 1B illustrate a centering method according to an embodiment of the present invention, wherein FIG. 1A is a side view and FIG. 1B is a plan view.

DETAILED DESCRIPTION OF EMBODIMENTS

Figure 2:
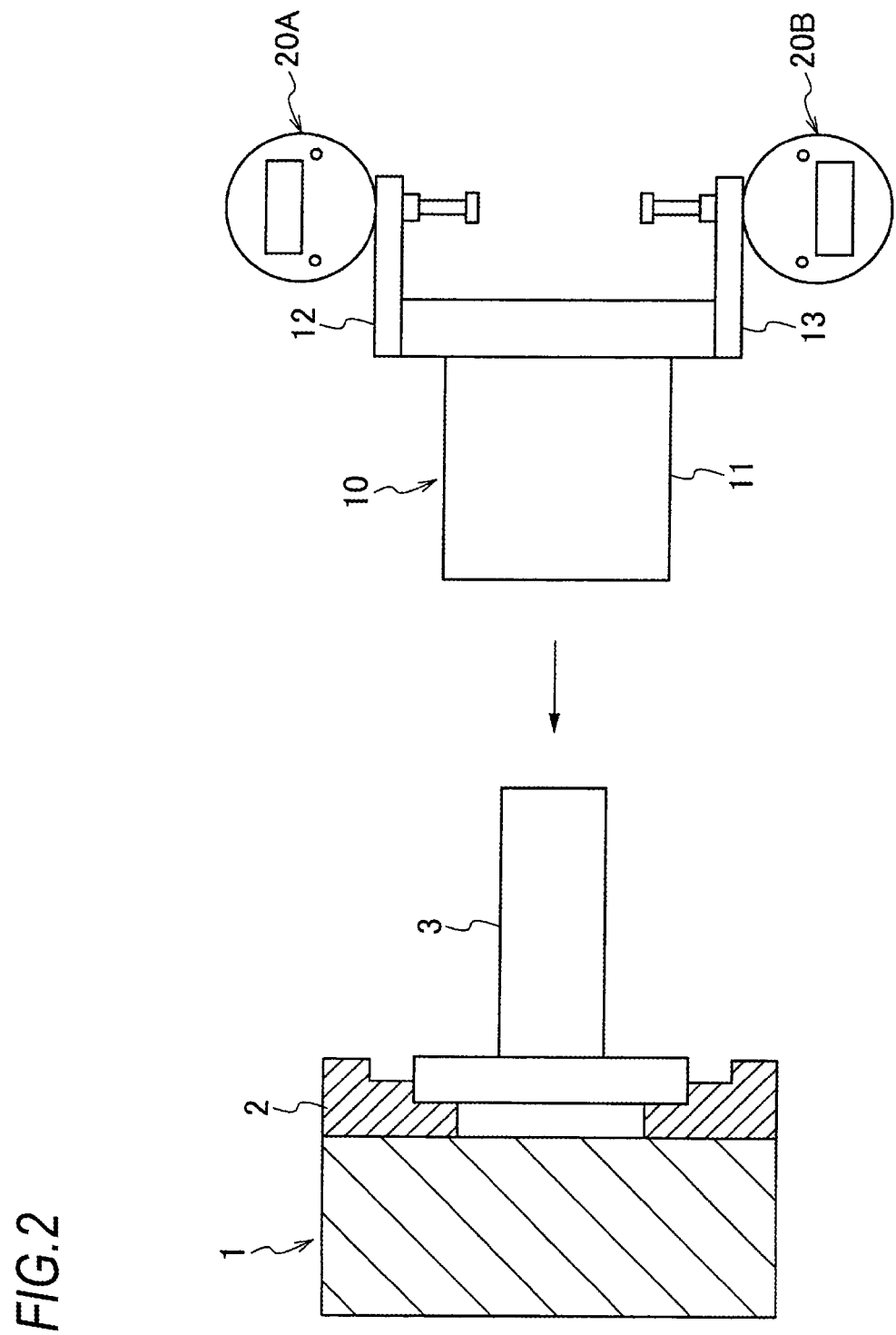
FIG. 2 illustrates a first process of the centering method.

Hereinafter, an embodiment of the present invention will be described based on the drawings. FIGS. 1A and 1B are views illustrating a centering method of the embodiment, and FIGS. 2 to 5 illustrate processes of the centering method.

As shown in FIG. 1, a thread grinder has a main shaft 1 rotatably supported to a main shaft board (not shown), and a grinding spindle 50 supported to a grinding wheel board (not shown) to face the main shaft 1 in an axis direction. The main shaft 1 is configured to be rotatable around a horizontal axis S, and a workpiece (not shown) is mounted to the main shaft 1. A grinding wheel shaft 51 is rotatably supported to a tip portion of the grinding spindle 50, and a disc-shaped grinding wheel 52 is attached to a tip portion of the grinding wheel shaft 51.

The grinding wheel 52 is configured to grind a thread groove on a cylindrical inner surface of the workpiece attached to the main shaft 1. Therefore, a rotation axis T of the grinding wheel shaft 51 is inclined by an angle $\alpha$ with respect to the axis S of the main shaft 1 in a reference plane parallel with the axis S of the main shaft 1, in accordance with a lead angle of the thread groove. In this embodiment, the reference plane parallel with the axis S of the main shaft 1 is a vertical plane, so that the grinding wheel 52 is inclined by the angle $\alpha$ in an upper-lower direction.

A measurement device for employing the centering method of this embodiment includes a cylindrical centering master 3 having a cylindrical outer surface 3A which is a centering reference and is mounted to the main shaft 1 via a chuck 2 with a center axis thereof being matched with the axis S of the main shaft 1, and a measuring unit 10 slidably fitted onto the cylindrical outer surface 3A of the centering master 3. The measuring unit 10 includes a cylindrical body 11 mounted to the cylindrical outer surface 3A of the centering master 3 so as to be slidable in an axis direction (an arrow A direction, in FIG. 1) and a circumferential direction (an arrow B direction, in FIG. 1), and two measuring instruments (indicators) 20A, 20B attached to the cylindrical body 11 via arms 12, 13.

The two measuring instruments 20A, 20B are mounted such that a displacement of the grinding wheel 52 in a direction orthogonal to the axis S of the main shaft 1 can be measured by bringing planar surfaces of probes 22 into contact with two edge parts (top and bottom parts, in this embodiment) of the grinding wheel 52 attached to the grinding wheel shaft 51 in the inclined direction. That is, the measuring instruments 20A, 20B are attached at positions spaced from each other in the circumferential direction by 180°. Here, at least one (only the measuring instrument 20B, in this embodiment) of the two measuring instruments 20A, 20B is mounted such that a position thereof relative to the cylindrical body 11 can be adjusted in a direction along the axis S of the main shaft 1 and denoted with an arrow C.

When performing the centering of the grinding wheel 52 with the measurement device, the centering master 3 having the cylindrical outer surface 3A, which is a centering reference, is first mounted to the main shaft 1 via the chuck 2, as shown in FIG. 2. At this time, the center axis of the centering master 3 is matched with the axis S of the main shaft 1. Then, the cylindrical body 11 of the measuring unit 10 is fitted onto the outer surface of the centering master 3.

Figure 3:
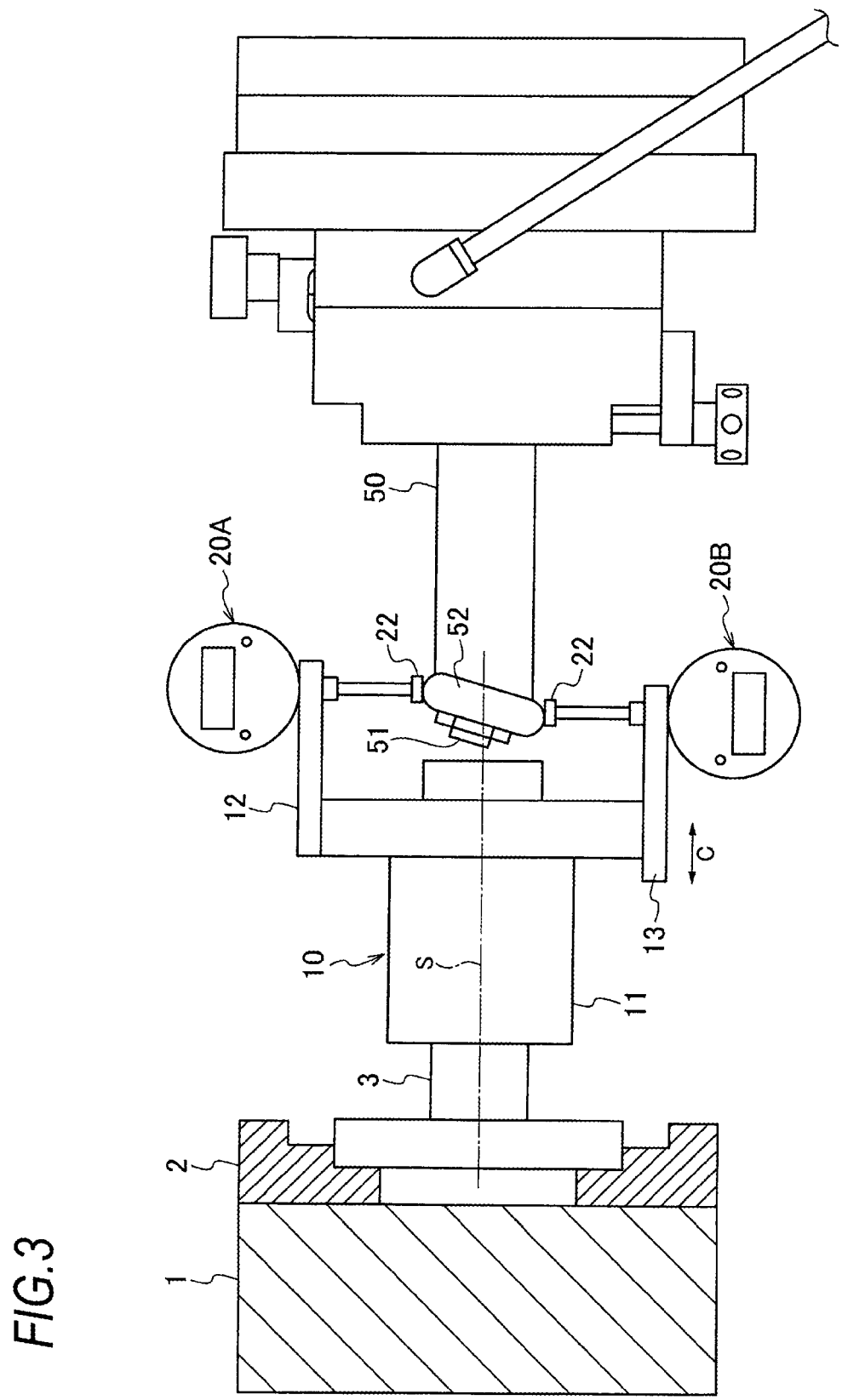
FIG. 3 illustrates a process subsequent to FIG. 2.

Then, as shown in FIG. 3, the measuring unit 10 is axially slid to adjust the positions of the two measuring instruments 20A, 20B in the axis S direction such that the probes 22 can respectively contact the two edge parts of the inclined grinding wheel 52. Specifically, at a state where the upper measuring instrument 20A is positioned such that the probe 22 thereof contacts the upper edge part, the lower measuring instrument 20B is axially (the arrow C direction) moved such that the probe 22 of the lower measuring instrument 20B can contact the lower edge part of the grinding wheel 52.

Figure 4:
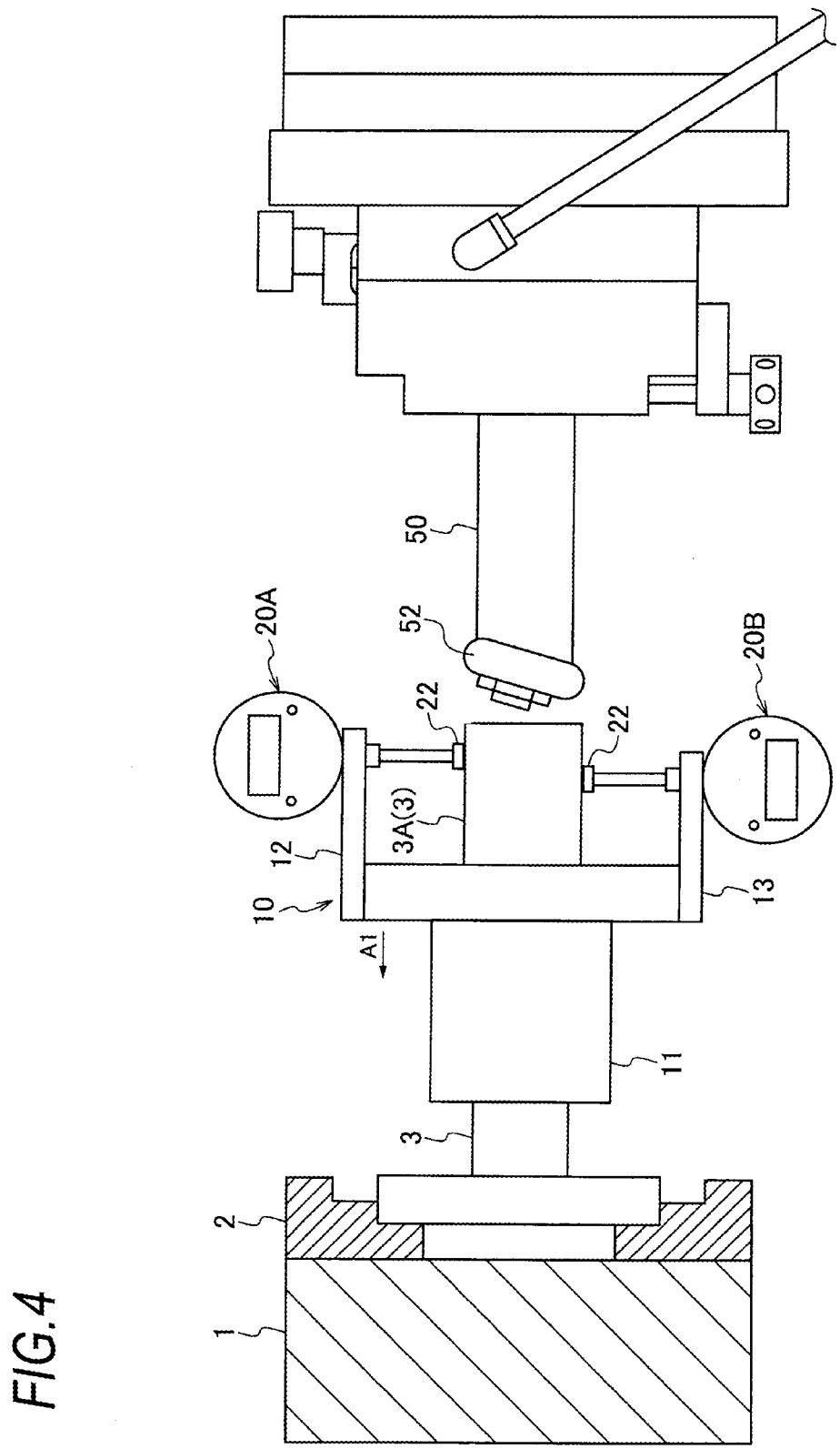
FIG. 4 illustrates a process subsequent to FIG. 3.

Subsequently, as shown in FIG. 4, the measuring unit 10 is axially (an arrow A1 direction) slid to bring the planar surfaces of the respective probes 22 of the two measuring instruments 20A, 20B into contact with the cylindrical outer surface 3A of the centering master 3. Accordingly, an origin (zero point) of each of the two measuring instruments 20A, 20B is set.

Figure 5:
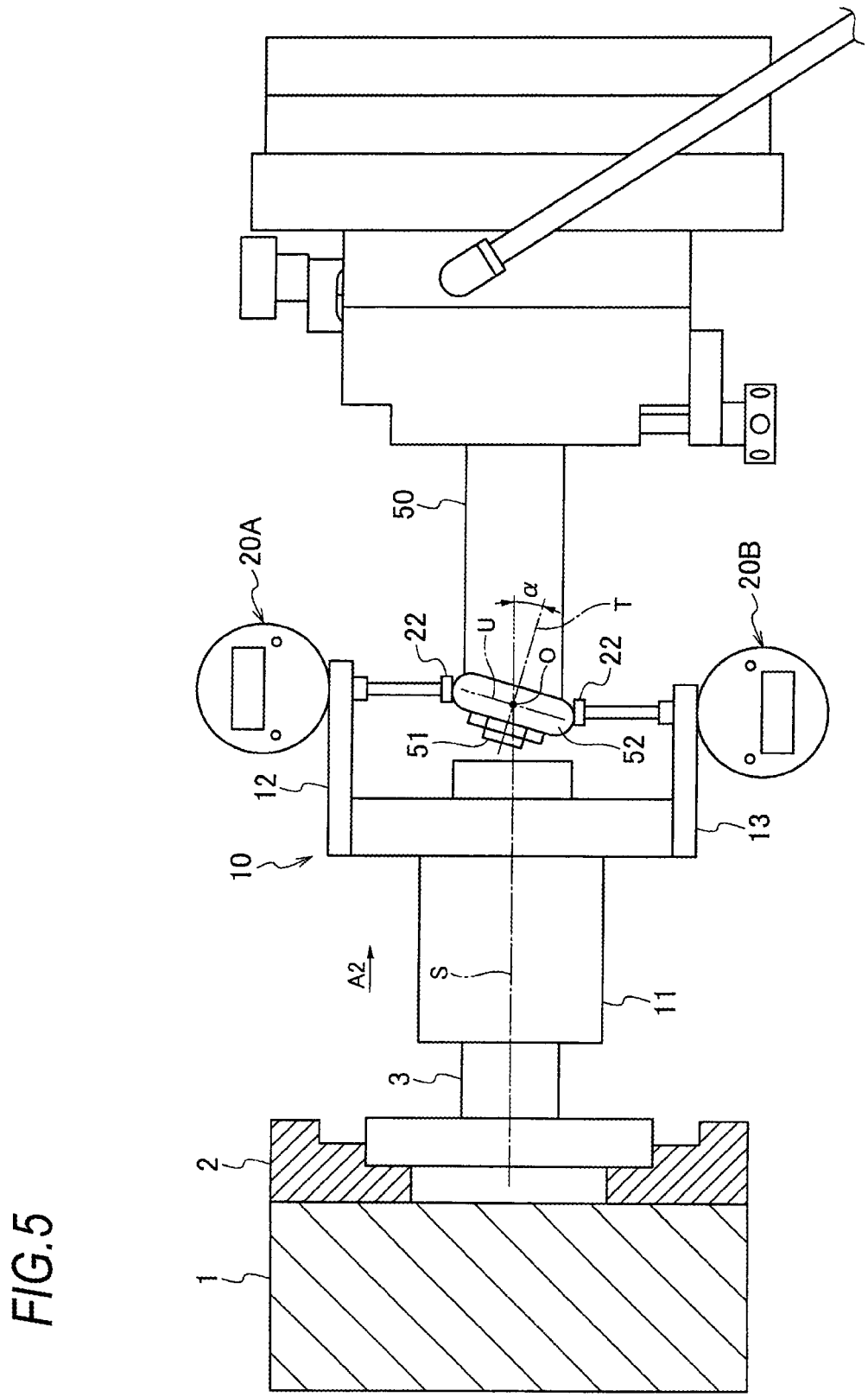
FIG. 5 illustrates a process subsequent to FIG. 4.

Then, as shown in FIG. 5, the measuring unit 10 is axially (an arrow A2 direction) slid on the centering master 3 to bring the respective probes 22 of the two measuring instruments 20A, 20B into contact with the two edge parts (top and bottom parts) of the grinding wheel 52 in the inclined direction.

Then, a position of the grinding wheel shaft 51 in the upper-lower direction is adjusted such that measured values obtained based on the origins of the two measuring instruments 20A, 20B become same. Accordingly, a center O (an intersection point of the rotation axis T of the grinding wheel shaft 51 and a center line U of the grinding wheel 52 in a thickness direction) of the grinding wheel 52 is centered with respect to the axis S of the main shaft 1 in the vertical plane.

Figure 6:
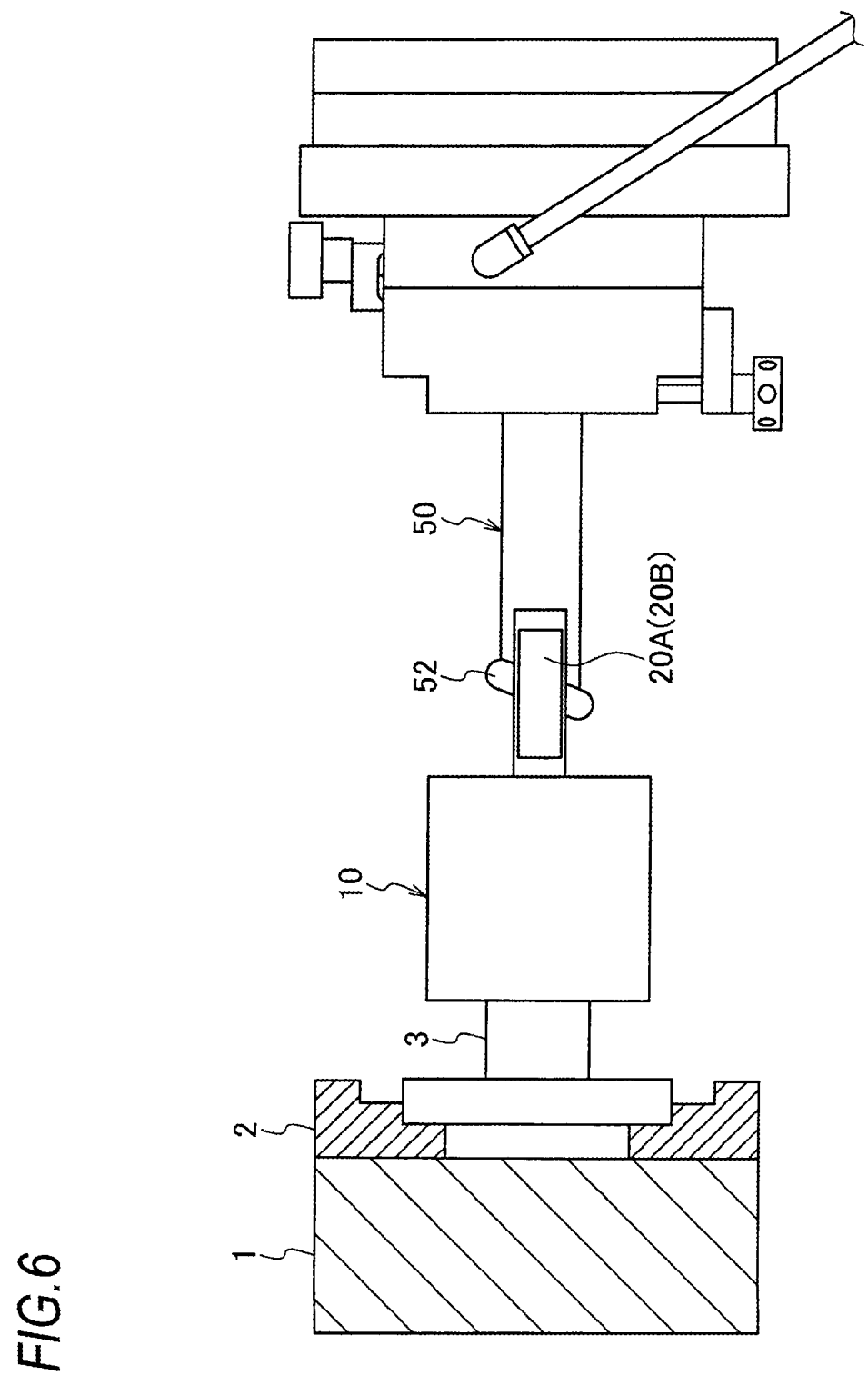
FIG. 6 is a side view illustrating a state where a centering of a grinding wheel is performed in a cutting direction.

Subsequently, a method for centering the grinding wheel 52 in a cutting direction (horizontal direction) is described. When centering the grinding wheel 52 in a cutting direction after centering the center of the grinding wheel 52 with respect to the axis S of the main shaft 1 in the vertical plane in the above process, the measuring unit 10 is rotated by 90° on the centering master 3 to position the two measuring instruments 20A, 20B in the horizontal plane, as shown in FIG. 6. Then, at this state, the positions of the two measuring instruments 20A, 20B are adjusted such that the probes 22 can respectively contact the two edge parts (left and right edge points, when the grinding wheel 52 is seen from the front) in the direction (horizontal direction) orthogonal to the inclined direction of the grinding wheel 52 attached to the grinding wheel shaft 51, from a radial direction orthogonal to the axis S of the main shaft 1. That is, the positions of the two measuring instruments 20A, 20B in the axis S direction are aligned.

Then, the probes 22 of the two measuring instruments 20A, 20B of which origins are set using the centering master 3 are respectively brought contact with the two edge parts. Then, the position of the grinding wheel shaft 51 is adjusted in the horizontal direction such that the measured values obtained based on the origins of the two measuring instruments 20A, 20B become same. Accordingly, the center O of the grinding wheel 52 is centered with respect to the axis S of the main shaft 1 in the horizontal plane.

As described above, the method for centering the grinding wheel in the thread grinder according to this embodiment includes: mounting the centering master 3 having the cylindrical outer surface 3A, which is a centering reference, to the main shaft 1 such that the center axis of the centering master 3 is matched with the axis S of the main shaft 1; mounting the measuring unit 10, which holds the two measuring instruments 20A, 20B such that the probes 22 can respectively contact the two edge parts of the grinding wheel 52 attached to the grinding wheel shaft 51 in the inclined direction from the radial direction orthogonal to the axis S of the main shaft 1, to the centering master 3 to be slidable in the axis direction of the centering master 3; setting the origins of the two measuring instruments 20A, 20B by bringing the respective probes 22 of the two measuring instruments 20A, 20B into contact with the cylindrical outer surface 3A of the centering master 3; moving the measuring unit 10 in the axis direction along the centering master 3 to thereby bring the respective probes 22 of the two measuring instruments 20A, 20B into contact with the two edge parts of the grinding wheel 52 in the inclined direction; and centering the center of the grinding wheel 52 with respect to the axis S of the main shaft 1 in the reference plane by adjusting the position of the grinding wheel shaft 51 such that the measured values obtained based on the origins of the two measuring instruments 20A, 20B become same. Accordingly, at a state where the grinding wheel 52 is mounted to the grinding wheel shaft 51, it is possible to simultaneously bring the probes 22 of the two measuring instruments 20A, 20B into contact with the two edge parts of the grinding wheel 52 in the inclined direction, from the radial direction orthogonal to the axis S of the main shaft 1, and to precisely measure the position of the inclined grinding wheel 52. Therefore, it is not necessary to perform a cumbersome operation of replacing a dedicated measuring jig and a grinding wheel. Also, there is no concern that the measuring precision is deteriorated due to the replacing operation, so that the centering can be precisely performed with a simple measuring operation.

The method further includes: adjusting the positions of the two measuring instruments 20A, 20B such that the probes 22 can respectively contact two edge parts of the grinding wheel 52 attached to the grinding wheel shaft 51 in a direction orthogonal to the inclined direction from the radial direction orthogonal to the axis S of the main shaft 1 at a state where the measuring unit 10 is rotated by 90° about the centering master 3, bringing the respective probes 22 of the two measuring instruments 20A, 20B of which the origins are set using the centering master 3 into contact with the two edge parts; and centering the center of the grinding wheel 52 with respect to the axis S of the main shaft 1 in a plane orthogonal to the reference plane by adjusting the position of the grinding wheel shaft 51 such that the measured values obtained based on the origins of the two measuring instruments 20A, 20B become same. Accordingly, the grinding wheel 52 can be centered in the cutting direction.

The measurement device for centering the grinding wheel in the thread grinder according to this embodiment includes the centering master 3 which has the cylindrical outer surface 3A, which is a centering reference, and is configured to be mounted to the main shaft 1 such that the center axis thereof is matched with the axis S of the main shaft 1, and the measuring unit 10 which includes the cylindrical body 11 configured to be mounted to the cylindrical outer surface 3A of the centering master 3 to be movable in the axis direction and the circumferential direction and the two measuring instruments 20A, 20B attached to the cylindrical body 11 and capable of measuring the displacement of the grinding wheel 52 in the direction orthogonal to the axis S of the main shaft 1 by bringing the probes 22 into contact with the two edge parts of the grinding wheel 52 attached to the grinding wheel shaft 51 in the inclined direction. Thereby, it is possible to simply and precisely perform the centering of the inclined grinding wheel 52 with the grinding wheel 52 being mounted to the grinding wheel shaft 51, just by using the centering master 3 and the measuring unit 10 having the two measuring instruments 20A, 20B attached to the cylindrical body 11.

At least one of the two measuring instruments 20A, 20B is mounted such that the position thereof can be adjusted relative to the cylindrical body 11 along the axis direction of the main shaft 1. Thereby, it is possible to arrange the measuring instruments 20A, 20B with the positions thereof deviating in the axis direction of the main shaft 1, and to bring the respective probes 22 of the two measuring instruments 20A, 20B into contact with the two edge parts of the grinding wheel 52 in the inclined direction. Also, since it is possible to change the positions of the measuring instruments 20A, 20B, it is possible to bring the edge parts of the grinding wheel 52 to the probes 22 of the measuring instruments 20A, 20B even when the inclined angle of the grinding wheel 52 is changed.

The present invention is not limited to the above embodiment and can be appropriately modified and improved. In addition, the materials, shapes, sizes, numbers, arrangement places and the like of the respective constitutional elements of the embodiment are arbitrary and are not particularly limited inasmuch as the present invention can be implemented.

Although the present invention has been described in detail with reference to the specific embodiment, it is apparent to one skilled in the art that a variety of changes and modifications can be made without departing from the spirit and scope of the present invention. The present application is based on Japanese Patent Application No. 2012-240925 filed on Oct. 31, 2012, the subject maters of which are incorporated herein by reference.

DESCRIPTION OF REFERENCE NUMERALS

1: Main shaft
3: Centering master
3A: Cylindrical outer surface
10: Measuring unit
20A, 20B: Measuring instrument
22: Probe
51: Grinding wheel shaft
52: Grinding wheel
S: Axis of main shaft
T: Rotation axis of grinding wheel
O: Center of grinding wheel The invention clamed is:

1. A method for centering a grinding wheel in a thread grinder which includes: a grinding wheel shaft; a grinding wheel attached to the grinding wheel shaft; and a main shaft which faces the grinding wheel shaft and to which a workpiece having a cylindrical inner surface to be ground with a thread groove is attached, wherein a rotation axis of the grinding wheel shaft is inclined with respect to an axis of the main shaft in accordance with a lead angle of the thread groove, the method comprising:
   mounting a centering master having a cylindrical outer surface to the main shaft such that a center axis of the centering master is matched with the axis of the main shaft;
   mounting a measuring unit to the centering master to be movable in an axis direction of the centering master, the measuring unit including: a first measuring instrument having a first probe configured to contact one edge part of the grinding wheel in an orthogonal direction orthogonal to the axis direction of the centering master; and a second measuring instrument having a second probe configured to contact another edge part of the grinding wheel opposite to the one edge part in the orthogonal direction;
   setting origins of the first and second measuring instruments by bringing the first and second probes into contact with the cylindrical outer surface of the centering master;
   moving the measuring unit in the axis direction of the centering master to thereby bring the first and second probes into contact with the respective edge parts of the grinding wheel in the orthogonal direction; and
   centering a center of the grinding wheel with respect to the axis of the main shaft by adjusting a position of the grinding wheel shaft such that a measured value obtained based on the origin of the first measuring instrument and a measured value obtained based on the origin of the second measuring instrument become same.

2. The method according to claim 1, further comprising:
   adjusting positions of the first and second measuring instruments such that the first probe contacts one edge part of the grinding wheel in a direction orthogonal to an inclined direction of the grinding wheel and the second probe contacts another edge part of the grinding wheel opposite to the one edge part in the direction orthogonal to the inclined direction of the grinding wheel, at a state where the measuring unit is rotated by 90° about the centering master from a state where the centering of the grinding wheel is performed;
   moving the first and second measuring instruments of which the origins are set using the centering master, in the axis direction of the centering master, to thereby bring the first and second probes into contact with the two edge parts of the grinding wheel in the direction orthogonal to the inclined direction of the grinding wheel; and
   centering the center of the grinding wheel with respect to the axis of the main shaft by adjusting the position of the grinding wheel shaft such that a measured value obtained based on the origin of the first measuring instrument and a measured value obtained based on the origin of the second measuring instrument become same.

3. A measurement device for centering a grinding wheel in a thread grinder including: a grinding wheel shaft, a grinding wheel attached to the grinding wheel shaft; and a main shaft which faces the grinding wheel shaft and to which a workpiece having a cylindrical inner surface to be ground with a thread groove is attached, wherein a rotation axis of the grinding wheel shaft is inclined with respect to an axis of the main shaft in accordance with a lead angle of the thread groove, the measurement device comprising:
   a centering master which has a cylindrical outer surface and is configured to be mounted to the main shaft such that a center axis of the centering master is matched with the axis of the main shaft; and
   a measuring unit which includes a cylindrical body configured to be mounted to the cylindrical outer surface of the centering master to be movable in an axis direction and a circumferential direction of the centering master, a first measuring instrument having a first probe configured to contact one edge part of the grinding wheel in an orthogonal direction orthogonal to the axis direction of the centering master, and a second measuring instrument having a second probe configured to contact another edge part of the grinding wheel opposite to the one edge part in the orthogonal direction, and which is configured to measure a displacement of the grinding wheel in the orthogonal direction by the first and second measuring instruments.

4. The measurement device according to claim 3, wherein at least one of the first and second measuring instruments is configured to be moveable relative to the cylindrical body in the axis direction of the centering master.

* * * * *